US 9,167,134 B2

(12) United States Patent  
Hirano

(10) Patent No.: US 9,167,134 B2  
(45) Date of Patent: Oct. 20, 2015

(54) IMAGING CONTROL DEVICE, IMMERSION POSITION INFORMATION GENERATION DEVICE, IMAGING CONTROL METHOD, IMMERSION POSITION INFORMATION GENERATION METHOD

(75) Inventor: Jun Hirano, Kanagawa (JP)

(73) Assignee: PANASONIC INTELLECTUAL PROPERTY MANAGMENT CO., LTD., Osaka (JP)

( * ) Notice: Subject to any disclaimer, the term of this patent is extended or adjusted under 35 U.S.C. 154(b) by 567 days.

(21) Appl. No.: 13/579,729

(22) PCT Filed: Mar. 16, 2011

(86) PCT No.: PCT/JP2011/001555
§ 371 (c)(1),
(2), (4) Date: Aug. 17, 2012

(87) PCT Pub. No.: WO2011/121920
PCT Pub. Date: Oct. 6, 2011

(65) Prior Publication Data
US 2012/0307020 A1    Dec. 6, 2012

(30) Foreign Application Priority Data

Mar. 30, 2010    (JP) .................. 2010-076910

(51) Int. Cl.
*H04N 13/02*    (2006.01)
*H04N 5/232*    (2006.01)
*G03B 35/08*    (2006.01)
*H04N 5/222*    (2006.01)

(52) U.S. Cl.
CPC ......... *H04N 5/2226* (2013.01); *H04N 5/23296* (2013.01); *H04N 13/0246* (2013.01); *H04N 13/0296* (2013.01); *G03B 35/08* (2013.01)

(58) Field of Classification Search
CPC ...................................... H04N 13/02
See application file for complete search history.

(56) References Cited

FOREIGN PATENT DOCUMENTS

| JP | 07-322128 A | 12/1995 |
| JP | 10-070740 A | 3/1998 |

(Continued)

OTHER PUBLICATIONS

International Search Report for PCT/JP2011/001555 dated Jun. 21, 2011.

*Primary Examiner* — Michael Teitelbaum
(74) *Attorney, Agent, or Firm* — Pearne & Gordon LLP

(57) ABSTRACT

A technology is disclosed that provides an imaging control device and the like capable of actualizing immersive zoom enlargement. The technology includes: an imaging unit 701 that includes at least two optical systems disposed at an interval of a predetermined baseline-length; a calculating unit 704 that, based on a predetermined reference zoom magnification, a desired zoom magnification in relation to the predetermined reference zoom magnification, and a distance from the imaging unit to a subject, calculates an immersion distance from a virtual position in which the imaging unit should be disposed to actualize the desired zoom magnification to an actual position of the imaging unit and calculates, based on the immersion distance, an interval between the at least two optical systems when the at least two optical systems are disposed on an extension line of a line connecting together the at least two optical systems to actualize a desired zoom magnification that is similar to that when the imaging unit is disposed in the virtual position and the desired zoom magnification is actualized; and a control unit 705 that changes the predetermined baseline-length to the calculated interval and disposes the at least two optical systems. The imaging unit images the subject in the above-described disposal state.

14 Claims, 8 Drawing Sheets

(56) References Cited

FOREIGN PATENT DOCUMENTS

| JP | 2003-107601 A | 4/2003 |
|----|---------------|--------|
| JP | 2005-024629 A | 1/2005 |
| JP | 2005-094364 A | 4/2005 |
| JP | 2007-195091 A | 8/2007 |
| JP | 2008-233579 A | 10/2008 |
| JP | 2009-210957 A | 9/2009 |

IMAGING CONTROL DEVICE, IMMERSION POSITION INFORMATION GENERATION DEVICE, IMAGING CONTROL METHOD, IMMERSION POSITION INFORMATION GENERATION METHOD

TECHNICAL FIELD

The present invention relates to an imaging control device, an immersion position information generation device, an imaging control method, and an immersion position information generation method by which images to be fused by a user are imaged.

BACKGROUND ART

Various attempts are being made to achieve optimal left-right binocular parallax adjustment in stereo cameras having left and right imaging optical systems. For example, an intersection position of optical axes of left and right video cameras is matched with a position of a subject by a steric effect adjustment mechanism using a drive motor, based on focus information. Alternatively, a baseline-length between left and right imaging optical systems of a stereo image imaging device and an angle of convergence are controlled using zoom magnification information, and an appropriate binocular parallax is generated (refer to Patent Document 1 to Patent Document 4).

In addition, a disclosure is made in which a value derived by a baseline-length before change in zoom magnification being multiplied by a reciprocal of the amount of change in the zoom magnification is set as a new baseline-length, and a point of intersection between the optical axes of left and right imaging optical systems is set in an angle of convergence of the same position as that before the change in baseline-length. As a result, the amount of deviation is controlled to differ only slightly from that before the change in zoom, thereby facilitating natural stereo image fusion by an observer (refer to Patent Document 5). Here, natural fusion refers to an observer perceiving an image for the right eye and an image for the left eye as a stereo image.

PRIOR ART DOCUMENTS

Patent Documents

Patent Document 1: Japanese Patent Application Publication No. 2008-233579
Patent Document 2: Japanese Patent Application Publication No. 1995-322128
Patent Document 3: Japanese Patent Application Publication No. 2009-210957
Patent Document 4: Japanese Patent Application Publication No. 2005-24629
Patent Document 5: Japanese Patent Application Publication No. 2003-107601

However, adjustment methods, such as those described above, that are effective when imaging a stereo image in medium- and close-range photographing may not be preferable when the stereo image is used as an image for broadcasting in medium- and long-range photographing. For example, in computer graphics (CG) serving as a technology for providing a similar stereo image, an observer parallax from any viewpoint can be set when rendering an image having parallax. Therefore, any position can be set as the viewpoint of the observer in any scene. In addition to simple zoom enlargement, zoom that gives an impression that the observer has approached to a target object (referred to, hereinafter, as immersive zoom for differentiation; and also includes the reverse action performed for zoom-out) can be directed. Here, "immersive zoom" means a zoom method in which the parallax is also changed in contrast with ordinary zoom in which only image enlargement is performed, thereby achieving a state similar to a state in which the observer is actually approaching to or away from the target object. In other words, in relation to zoom in which a far-away object is enlarged (a sense of looking through a pair of binoculars), there is a difference in expression in that a state is achieved in which the object appears larger because the observer has approached to the object (a sense for accompanying movement of viewpoint).

Here, a problem that is not much of an issue in medium- and close-range photographing occurs in that sense of immersion is lost as a result of difference in the percentage of concavity and convexity of a subject in relation to distance to the subject (parallax occurring in the subject in relation to the depth of visual field space) in a scene taken by medium- and long-range photographing, unlike a scene in which fusion by the observer is, in fact, facilitated by suppressing binocular parallax. For example, taking into consideration an amount of running out (10%) of concavity and convexity of 10 cm in a three-dimensional (3D) area having a depth of 1 m and an amount of running out (0.2%) of concavity and convexity of 10 cm in a 3D area having a depth of 50 m, in a scene that attempts to express that the stereo effects felt by the observer differ, the sense of immersion and the sense of presence experienced by the observer may be diminished unless, rather than simple zoom enlargement, immersive zoom that be connected with the position of the observer (assumed for purpose of directing) is expressed.

When based on only the conventional method, a problem occurs in that, even when baseline-length setting and angle of convergence setting based on distance is performed, although distortion and deviation during fusion can be reduced, the sense of immersion is weak regardless of zoom being performed. In addition, a problem occurs in that the sense of immersion is lost even when near-field view deviation caused by the baseline-length being shortened during zoom is reduced.

Moreover, when directing a sense of immersion, although the angle of conversion should increase when the observer approaches to the object under actual environment, this does not occur in an image obtained by zoom enlargement. Rather, as shown by broken lines in FIG. 11, the angle of convergence is unchanged or becomes smaller. Therefore, a problem occurs in that the observer experiences discomfort from visual information that differs from ordinary senses and becomes difficult in fusion. The position of the observer's viewpoint becomes unclear to the observer during playback.

Straight lines in FIG. 11 show an instance in which a screen area is imaged at a magnification serving as a basis. The positions, angle of convergence, baseline-length, and parallax images of two optical systems in this instance are shown. In addition, dashed lines in FIG. 11 show an instance in which a camera has approached to the subject. The positions (closer), angle of convergence (larger), baseline-length (unchanged), and parallax images (the subject is larger and the parallax is larger) of the two optical systems in this instance are shown.

SUMMARY OF INVENTION

In light of the above-described problems, an object of the present invention is to provide an imaging control device, an immersion position information generation device, an imaging control method, and an immersion position information generation method. The present invention is capable of matching a virtual viewpoint with a zoom position while keeping a fixed focal point and actualizing immersive zoom enlargement.

To achieve the above-described object, the present invention is an imaging control device that images at least two images used to enable a user to perceive a subject positioned at a predetermined distance away or more from an imaging point as being three-dimensional. The imaging control device includes: an imaging unit for imaging the subject, the imaging unit including at least two optical systems disposed at an interval of a predetermined baseline-length; a calculating unit for calculating, when a zoom magnification of the at least two optical systems disposed at the baseline-length interval serves as a reference zoom magnification, based on the reference zoom magnification, a desired zoom magnification in relation to the predetermined reference zoom magnification, and a distance from the imaging unit to the subject, an immersion distance that is a distance from a virtual position in which the imaging unit should be disposed to actualize the desired zoom magnification to an actual position of the imaging unit, and calculating an interval between the at least two optical systems when the at least two optical systems are disposed on an extension line of a line connecting actual positions of the at least two optical systems to actualize a desired zoom magnification similar to that when the imaging unit is disposed in the virtual position and the desired zoom magnification is actualized, based on the calculated immersion distance; and a control unit for changing the predetermined baseline-length to the calculated interval and disposing the at least two optical systems. The imaging unit images the subject in a state in which the at least two optical systems are disposed by the control unit. As a result of this configuration, immersive zoom enlargement can be actualized. The predetermined distance refers to a distance by which immersive zoom can be actualize as a result of the baseline-length being changed to be longer in coordination with zoom. In addition, the user herein refers to an observer, described hereafter (the same applied hereinafter).

In addition, the present invention is an immersion position information generation device that, based on information from an imaging control device that images at least two images used to enable a user to perceive a subject positioned at a predetermined distance away or more from an imaging point as being three-dimensional, generates information to enable the subject to be perceived as being three-dimensional. The immersion position information generation device includes: a receiving unit for receiving information on a virtual viewpoint position of the user from the imaging control device; and a generating unit for generating image information in which the received information on the virtual viewpoint position is added to a taken image from the imaging control device. As a result of this configuration, immersive zoom enlargement can be actualized.

In addition, the present invention is an imaging control method for imaging at least two images used to enable a user to perceive a subject positioned at a predetermined distance away or more from an imaging point as being three-dimensional. The imaging control method includes: a calculating step of calculating, when a zoom magnification of at least two optical systems disposed at an interval of a predetermined baseline-length serves as a reference zoom magnification, based on the reference zoom magnification, a desired zoom magnification in relation to the predetermined reference zoom magnification, and a distance from an imaging unit that includes the at least two optical systems and images a subject to the subject, an immersion distance that is a distance from a virtual position at which the imaging unit should be disposed to actualize the desired zoom magnification to an actual position of the imaging unit, and calculating an interval between the at least two optical systems when the at least two optical systems are disposed on an extension line of a line connecting actual positions of the at least two optical systems to actualize a desired zoom magnification similar to that when the imaging unit is disposed in the virtual position and the desired zoom magnification is actualized, based on the calculated immersion distance; a control step of changing the predetermined baseline-length to the calculated interval and disposing the at least two optical systems; and an imaging step of imaging the subject in a state in which the at least two optical systems are disposed at the control step. As a result of this configuration, immersive zoom enlargement can be actualized.

In addition, the present invention is an immersion position information generation method for generating, based on information from an imaging control device that images at least two images used to enable a user to perceive a subject positioned at a predetermined distance away or more from an imaging point as being three-dimensional, information enabling the subject to be perceived as being three-dimensional. The immersion position information generation method includes: a receiving step of receiving information on a virtual viewpoint position of the user from the imaging control device; and a generating step of generating image information in which the received information on the virtual viewpoint position is added to a taken image from the imaging control device. As a result of this configuration, immersive zoom enlargement can be actualized.

The imaging control device, the immersion position information generation device, the imaging control method, and the immersion position information generation device of the present invention are capable of actualizing immersive zoom enlargement.

DESCRIPTION OF EMBODIMENTS

An embodiment of the present invention will be described with reference to FIG. 1 to FIG. 10. To simplify the description, an imaging magnification and a viewpoint setting at the start of a zoom operation serve as reference. For example, when the magnification is 1 time and an observer viewpoint is the setting position of optical systems, a baseline-length is set to the binocular distance of a typical viewer. Here, the "baseline-length" refers to an interval between the optical systems (such as a default value), and is an interval that, when spaced by an interval between the eyes of a typical human being, enables images taken in this state to be stereoscopically viewed by an observer. In addition, in a composition in which a subject is captured near the center of a screen, a focal point position of the optical systems is set at the position of the subject.

Figure 1:
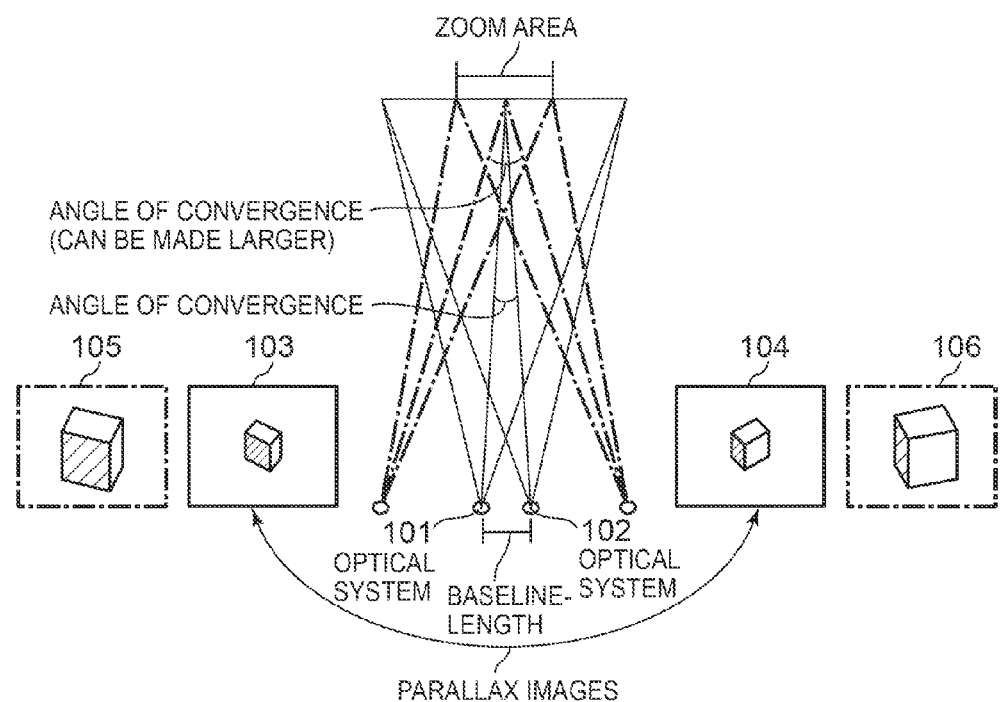
FIG. 1 is a diagram for explaining an overview of an embodiment of the present invention.

Two optical systems 101 and 102 are shown in FIG. 1. The distance between the two optical systems 101 and 102 is the baseline-length. The optical systems 101 and 102 can be part of an imaging unit 701, described hereafter. Images 103 and 104 of a subject respectively imaged by the optical systems 101 and 102 from the respective positions of the optical systems 101 and 102 are shown in FIG. 1. Here, the positions of the optical systems 101 and 102 refer to a virtual viewpoint determined from parallax in a composition prior to zoom being performed. The parallax in a composition prior to zoom being performed refers to a difference in view between an image for the right eye and an image for the left eye. In addition, the virtual viewpoint refers to a viewpoint and a position of the viewpoint at which a size sensed by the observer as a result of the viewpoint moving in relation to the magnification serving as reference when the zoom magnification is changed is assumed to be achieved. In an imaging control device, control is performed such as to secure an angle of convergence (immersive zoom) formed when, in adherence to a zoom magnification for screen enlargement, the viewpoint of the observer (virtual viewpoint) is moved to an equivalent position, with the positions (viewpoints) of the optical systems 101 and 102 serving as reference. Here, the angle of convergence refers to an angle formed by the two optical systems 101 and 102 in relation to the focal position.

Specifically, as shown by dashed lines in FIG. 1, control is performed such that the baseline-lengths between the optical systems 101 and 102 increase, thereby matching the angle of convergence formed in relation to the focal position with an angle of convergence formed (made larger) when the position of the virtual viewpoint corresponds with the zoom magnification of enlargement. Images 105 and 106 of this case are shown in FIG. 1. At this time, when the focal position is fixed and the composition capturing the subject is to be kept unchanged or is changed to any composition, it is preferable to take into consideration that the direction of the optical system depending on the case changes. Here, the direction of the optical system refers to a rotation angle with the vertical direction of the optical system serving as an axis.

In addition, when expressed by a control method from another viewpoint, if the amount of change to increase the baseline-length can be coped with the angle of convergence formed by control of the rotation direction of each optical system 101 and 102, in other words, the angle of convergence can be made larger by rotating the optical systems 101 and 102, the change can be performed by only control of the rotation directions of the optical systems 101 and 102 (or in combination with control of the baseline-length). In other words, when a plurality of optical systems (at least two optical systems) are able to self-rotate, a virtual viewpoint position calculating unit 704 described hereafter can, when calculating the length (interval) of the baseline-length, if the angle of convergence can be made larger by rotating the plurality of optical systems, calculate the length (interval) of the baseline-length taking into consideration the angle of convergence formed by the rotation of the plurality of optical systems.

Changes in composition before and after immersive zoom vary with the imaging scene. Therefore, depending on the distance to the focal position, the position of the virtual viewpoint before and after zoom, and the position of the main subject on the screen (deviation from the center position of the screen), the baseline-length to be increased and the rotation angles of the optical systems may differ. However, the result is that the above-described control method achieves similar effects in terms of control being performed such that the angle of convergence becomes larger based on the position of the virtual viewpoint to which the viewpoint of the observer moves after zoom. Here, the changes in composition before and after immersive zoom include that the composition remains unchanged in the sense that the main subject is captured in the center of the screen.

In addition, as another method, depending on the directing during imaging, when changes during the zoom operation can be ignored (when the changes can be cut such as by switching to another viewpoint camera) or switching between a plurality of fixed virtual viewpoint positions can be performed, the baseline-length may be secured by an image from another optical system. The other optical system includes a configuration that is separated as a camera unit.

In particular, in an instance in which the optical system is separated as a camera unit, the respective horizontal positions of the optical systems preferably match. A reason for this is that, unless at least the compositions and focal positions match in the ultimately fused images, natural fusion by the observer becomes difficult.

As a result of control such as those described above, a parallax image similar to that when the observer has approached to the subject can be obtained by imaging being performed such as to increase the distance between the optical systems to increase the baseline-length during zoom. Immersive zoom can be performed. In the description above, an operation performed when zooming (enlarging direction, zoom-in) is described. However, the operation is performed in reverse when zooming in a reducing direction (zoom-out, zoom-back).

Next, notification of the virtual viewpoint position (position at which the observer can be considered to have approached to the subject as a result of zoom) calculated by the imaging control device will be described. Specific processes performed by the imaging control device, such as calculation of the virtual viewpoint position, will be described hereafter. The virtual viewpoint position is a position of viewpoint determined from the zoom magnification in relation to the focal position (distance to the subject to be zoomed) and the camera position (actual viewpoint).

Figure 2:
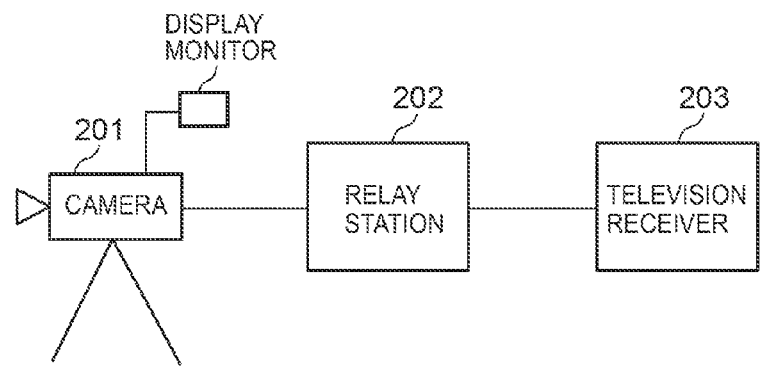
FIG. 2 is a diagram for explaining an example of when notification of a virtual viewpoint position is given according to the embodiment of the present invention.

In actuality, determining the virtual viewpoint position may not be this simple. A more accurate virtual viewpoint position may be determined by taking into consideration the amount of change in the angle of convergence from the rotation angles of the optical systems and the like. Specifically, an example of when notification of the virtual viewpoint position is given is shown in FIG. 2. As shown in FIG. 2, information on the virtual viewpoint position is transmitted from a camera 201 (including the imaging control device) to a relay station (including a broadcast station and the like) 202 and the like. The relay station 202 and the like transmit the information on the virtual viewpoint position with imaging content to a television receiver 203 of a viewer and the like. The flow by which the information on the virtual viewpoint position is transmitted is not limited thereto.

Figure 3:
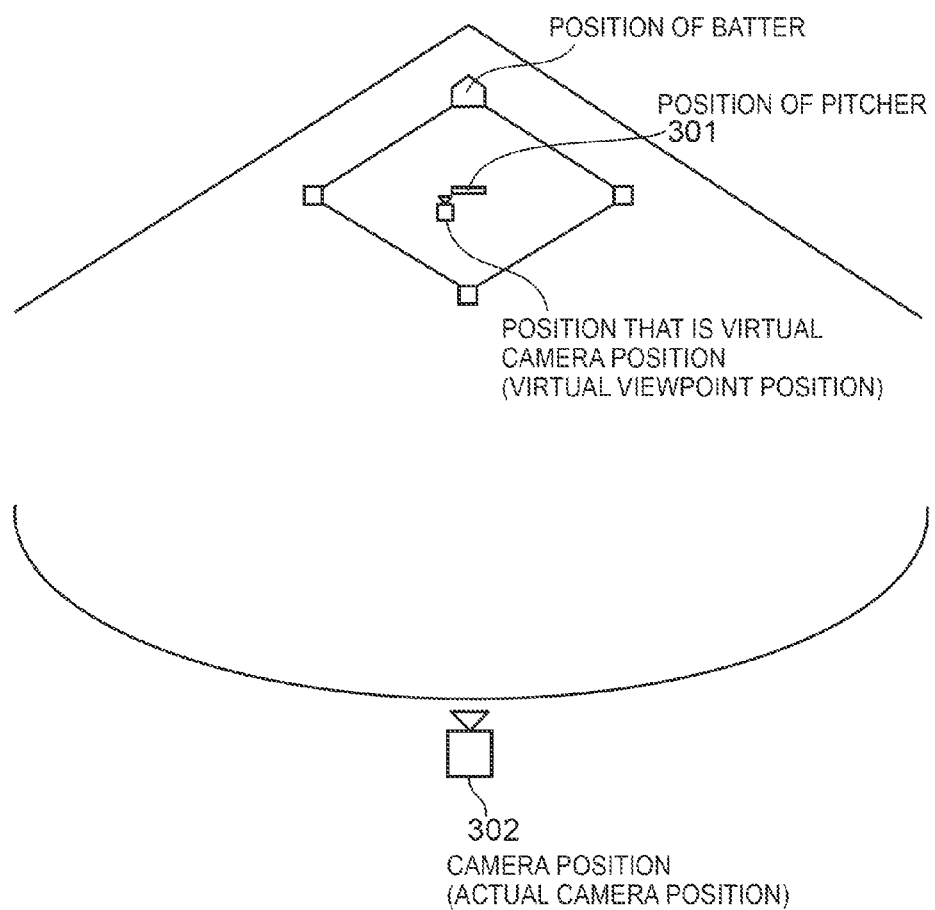
FIG. 3 is a diagram for explaining an example in which an imaging control device and an immersion position information generation device according to the embodiment of the present invention are applied.

As a result of notification of the virtual viewpoint position, the virtual viewpoint position can be used to indicate the position of the observer in an overall imaging area on a display or the like. For example, as shown in FIG. 3, in an instance in which imaging content of a baseball field is provided, when the view of a batter from a position 301 of the pitcher is imaged, the location of the virtual viewpoint position within the baseball field (where the observer is assumed to be) can be indicated on a display or the like. Camera position 302 is actually in the rear of the baseball field.

Figure 4:
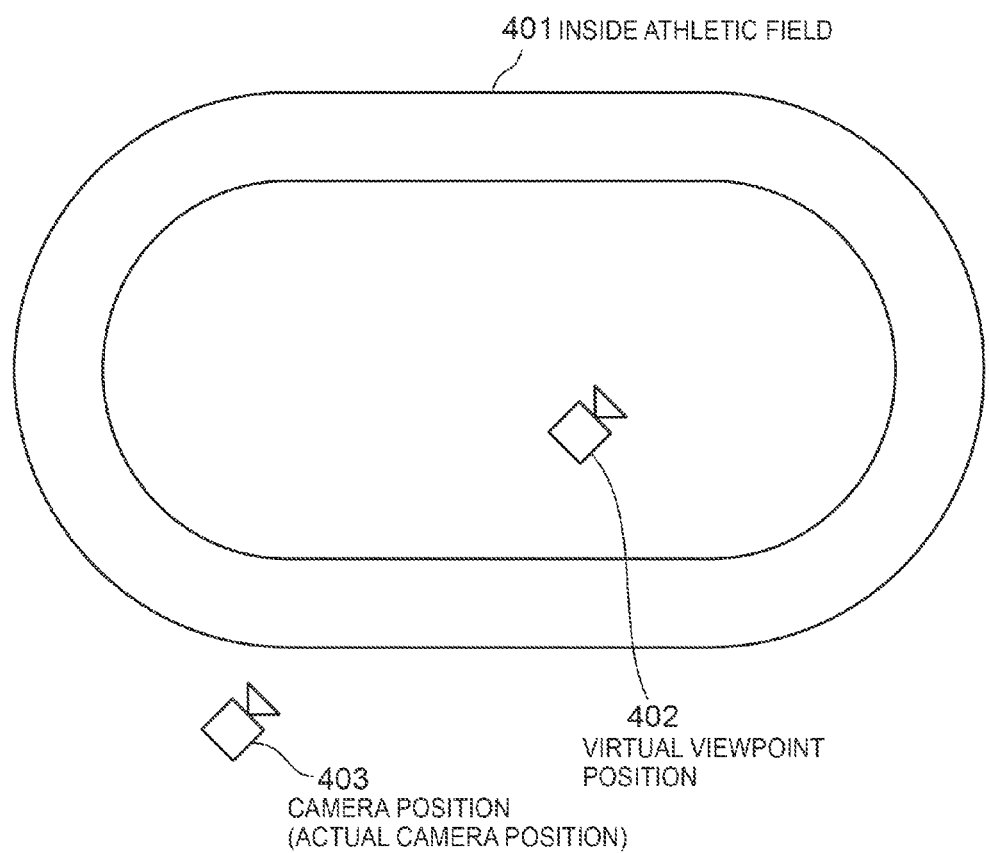
FIG. 4 is a diagram for explaining another example in which the imaging control device and the immersion position information generation device according to the embodiment of the present invention are applied.

In addition, as shown in FIG. 4, in an instance in which the camera cannot enter inside an athletic field 401, to give the impression of imaging from close range to the athletes in a virtual manner by zoom, a virtual viewpoint position 402 can be indicated on a display or the like. The camera position 403 is actually outside of the athletic field 401. Furthermore, when a view of the athletes from the position of a judge is imaged, or when a view of a shoot from a goal position is imaged, the virtual viewpoint position can be indicated on a display or the like. In this way, as a result of the observer (viewer) being able to grasp their own position as a means for conveying natural realism to the observer (viewer), 3D motion sickness (discomfort accompanying fusion and the like) can be alleviated.

In addition, the virtual viewpoint position determined from the setting state (zoom magnification and the like) of the camera and an amount of error in an evaluation value of the sense of immersion obtained from the image can be determined, and the information on the virtual viewpoint position can be corrected, or the setting state of the camera can be changed. Here, the evaluation value of the sense of immersion obtained from the image refers to an immersion position sensed by the observer. The immersion position sensed by the observer refers to a position at which, if the observer move from the actual camera position (or the position serving as reference), the observer is assumed to be as a result of control of the optical systems. Because discomfort and perceptual illusion experienced by human beings cannot necessarily be resolved by information determined solely from the setting state of the camera, the parallax image that is actually imaged is evaluated and the amount of error thereof is corrected.

Here, the notification of the virtual viewpoint position will be described in further detail. Here, a baseball broadcast will be used as an example of image content. In the baseball broadcast, the view of the batter from the viewpoint of the pitcher is considered. The actual camera position is behind the center field fence, and the batter is imaged from this position (1 time zoom). The distance from the position of the camera to the batter (depth) is, for example, 120 m. The baseline-length is, for example, 6 cm. Under this condition, when zoom is performed to the pitcher viewpoint (4 times zoom), the virtual viewpoint position is at the 30 m point from the focal (batter) (90 m point from the camera). The baseline-length is 24 cm.

Figure 5:
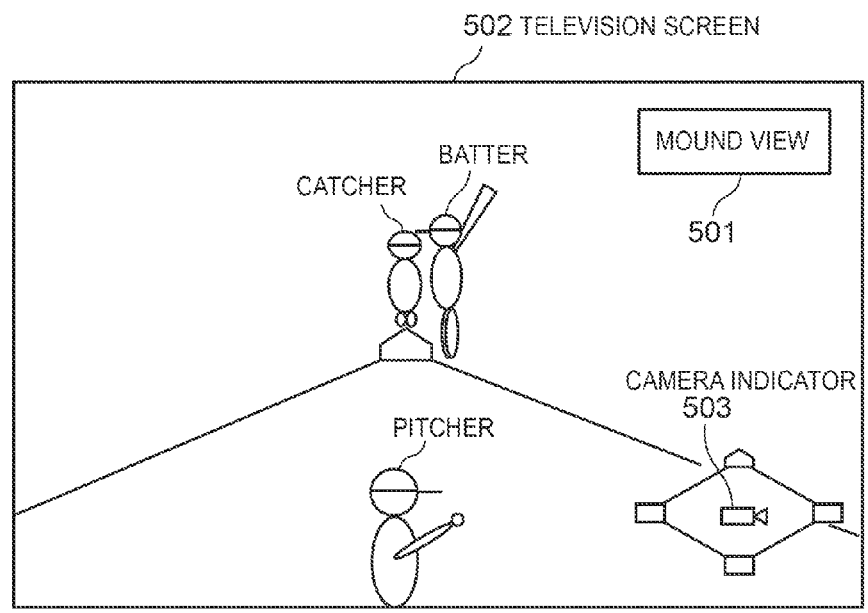
FIG. 5 is a diagram of an example of an image that is provided according to the embodiment of the present invention.

In this instance, the relay station or the like is notified of the virtual viewpoint position. As a result of the notification of the virtual viewpoint position, as shown in FIG. 5, an indicator giving notification that the viewpoint is near the mound (such as a mound view indicator 501) is indicated on a television screen 502. In addition, the virtual viewpoint position can be indicated such as to appear as if the camera is actually inside the baseball field (camera indicator 503), and broadcast can be performed by the position of the viewpoint within the field (location where the viewer is assumed to be) being superimposed and the like. A text telop may be shown on the television screen 502 or the like to indicate the location of the viewpoint. In addition to indicate, notification can be given by voice, announcement, data guidance, and the like.

As a result, realism that differs from that when the viewer is watching from the stands can be provided. In addition, as a result of the viewer knowing their virtual position (knowing the location to which the viewer has moved and the location of the view to which the image is equivalent), the difficulty of 3D fusion accompanying zoom and camera switching can be physiologically compensated. This is similar to, for example, the expectation that 3D motion sickness and the like can be alleviated by the observer understanding their movements and positions in the image that the observer is viewing, based on there being instances in which screen motion sickness experienced by an operator of a first-person viewpoint game (who understands the operations they are making and the location to which they are moving within a virtual 3D space) is less severe compared to motion sickness in an observer (who is viewing the screen of the results of the operations made by the operator).

In addition, notification of the virtual viewpoint position being made to a director (including stage directors and cameramen) can also be considered. As a result of the notification to the director, the virtual viewpoint position can be used as reference information for directing by the virtual viewpoint position being indicated in real-time with the position equivalent to the movement of the viewpoint as a result of zoom. In addition, zoom control and virtual viewpoint position control may be changed independently. As a result of change being performed independently, zoom control and virtual viewpoint position control can be used as effects during directing.

Figure 6:
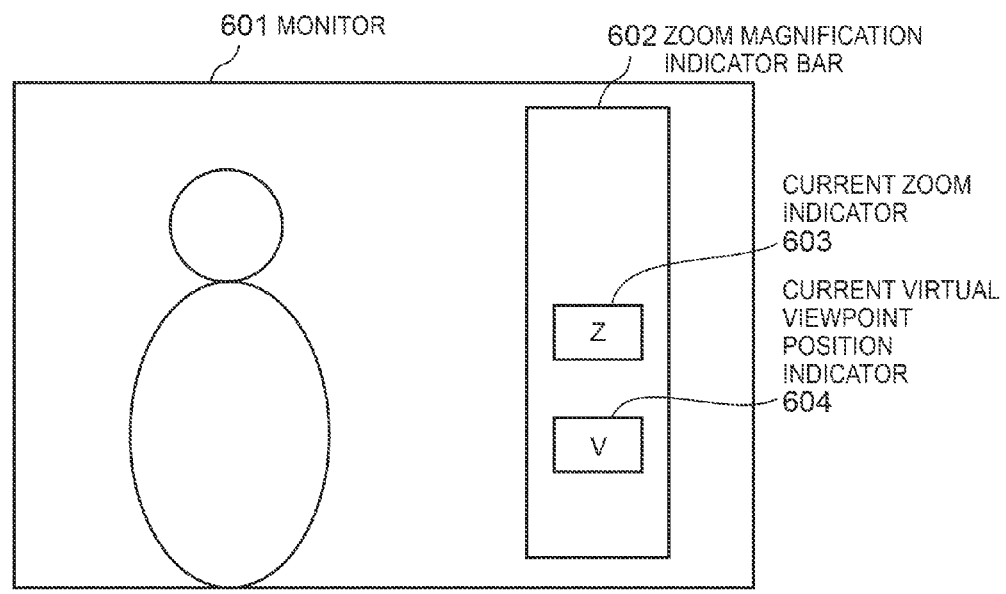
FIG. 6 is a diagram of an example of an indicator bar for zoom magnification (including an indicator of current zoom and an indicator of current virtual viewpoint position) indicated on a monitor according to the embodiment of the present invention.

As shown in FIG. 6, the director can perform various types of directing using a zoom magnification indicator bar 602 (including a current zoom indicator 603 and a current virtual viewpoint position indicator 604) indicated on a monitor 601. Specifically, special directing can be performed by the virtual viewpoint being made to follow the zoom operation with intentional delay in relation to the zoom speed (change in the amount of zoom) of the camera. In other words, a baseline-length control unit 705 and an optical system control unit 703, described hereafter, control the disposal of at least two optical systems such as to make the virtual viewpoint follow the zoom operation with delay in relation to the change in zoom in an image imaged by the imaging unit 701. For example, zoom movement can be given distinction as a result of the virtual viewpoint being unchanged at the start of zoom, control being started such as to move the virtual viewpoint after a slight delay, and the virtual viewpoint following such as to match the final zoom magnification in an accelerating manner. In addition, for example, as a result of the virtual viewpoint being made to follow slowly at a speed slower than the zoom speed, the changes experienced by the observer can be suppressed and strain during viewing can be reduced.

Zoom operations and changes in virtual viewpoint position, such as that described above, may instead result in compromising natural fusion by the observer. Therefore, the director is preferably capable of managing the scenes to be used and the frequency as directing. Even for such purposes, giving notification of the virtual viewpoint position to enable the director (the camera operator in some instances) to confirm the virtual viewpoint position is effective.

Figure 7:
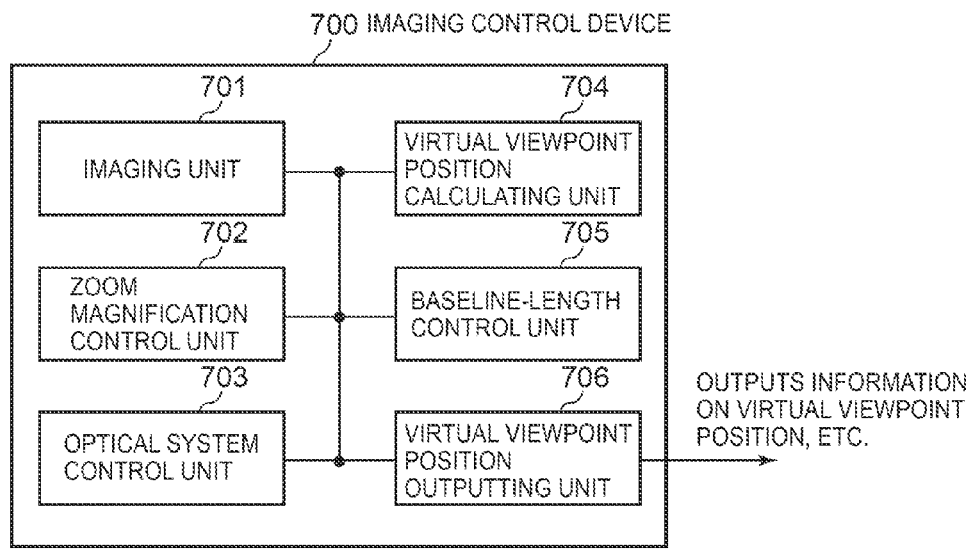
FIG. 7 is a block diagram of an example of a configuration of the imaging control device according to the embodiment of the present invention.

Next, an example of a configuration of the imaging control device according to the embodiment of the present invention will be described with reference to FIG. 7. The configuration is not limited thereto, and other constituent elements may be included. An imaging control device 700 performs imaging that changes the virtual viewpoint position, such as immersive zoom, while controlling the optical systems, and outputs the virtual viewpoint position that is set as a result of control. The constituent elements of the imaging control device will be described hereafter.

The imaging unit 701 has the functions of a typical camera that takes images. In the present invention, in particular, the imaging unit 701 includes the functions of a camera using a plurality of typical optical systems. The imaging unit 701 has the optical systems 101 and 102, for example as shown in FIG. 1. A zoom magnification control unit 702 sends information for realizing the set zoom magnification to the optical system control unit 703 and uses feedback information including the control results from the optical system control unit 703 to reflect the information in control.

The optical system control unit 703 works in cooperation with the zoom magnification control unit 702, the baseline-length control unit 705 and the like, and controls the optical systems mechanically and by software to determine the image for imaging by the imaging unit 701. In addition, the optical system control unit 703 performs feedback of control results of control performed based on respective control instructions to the sources of the instructions. In the optical system control unit 703, other types of control that are omitted in the detailed description of the present invention, such as control of the rotation direction of the optical system, control of camera shaking, control of brightness, and the like are also included.

The virtual viewpoint position calculating unit 704 calculates the immersion position (immersion distance) indicating how far the virtual viewpoint position approached to (or moved away from) the focal position (such as the position of the subject) from the reference position of the camera, based on the zoom magnification serving as reference, the current magnification in relation to the reference magnification, and the setting values of other optical systems. Here, the reference position of the camera refers to, for example, the actual position of the camera (may be the actual position of the optical system). The zoom magnification serving as reference preferably uses as reference a setting state that achieves a suitable parallax (a state in which the baseline-length is equivalent to the distance between both eyes of the observer) when the observer observes from a position at which 1 time zoom serves as reference (a state without enlargement or reduction). In a setting example of a typical reference state, the setting position of the camera is the position of the observer, the zoom magnification of the optical system is set to 1 time, and the baseline-length between the optical systems is set to the distance between both eyes of a typical observer.

Here, the immersion position refers to a movement position (movement distance) in an instance in which the observer is assumed to have moved to a position at which the image appears to have become enlarged (or reduced), rather than the image being enlarged (or reduced) by the set zoom magnification. For example, when zoom-in is performed, in the movement position (in other words, the immersion position) assumed when the observer has approached by an amount equivalent to the amount by which the image appears to have become larger in comparison to that before enlargement, the angle of convergence increases when the observer views the object to be imaged from this position. However, in actuality, the camera merely enlarges the image, and the camera itself does not move. Therefore, to achieve the amount of increase in the angle of convergence that is equivalent, the baseline-length of the optical systems is increased.

In addition, for example, when zoom-out is performed, in the movement position assumed when the observer has moved away by an amount equivalent to the amount by which the image appears to have become smaller in comparison to that before reduction, the angle of convergence decreases when the observer views the object to be imaged from this position. However, in actuality, the camera merely reduces the image, and the camera itself does not move. Therefore, to achieve the amount of decrease in the angle of convergence that is equivalent, the baseline-length of the optical systems is decreased.

Therefore, because, although the camera itself is performing zoom, the assumed observer viewpoint moves to the immersion position, when the image is viewed from the immersion position, the image is equivalent to that as if the zoom magnification has remains at 1 time. When the camera itself actually moves in the direction of the zoom operation (regardless of whether the direction is forward or backward), the virtual viewpoint position is preferably corrected to change the baseline-length taking into consideration the movement amount. Alternatively, information required to correspond the virtual viewpoint position to the actual position is preferably correlated.

In addition, the virtual viewpoint position calculating unit 704 calculates the amount of baseline-length enabling a suitable parallax (angle of convergence) to be achieved and the control amount of the other optical systems (rotation amount, light amount, and the like of the optical system), to move the virtual viewpoint position to the calculated desired immersion position, and transmits the amount of baseline-length and the control amount to respective control systems. Furthermore, in addition to control (immersive zoom) performed such as to match the virtual viewpoint position with the immersion position by zoom at all times, the degree of change and the amount of change depends on any directing pattern, the virtual viewpoint position may be changed based on fluctuations, errors, and other change patterns. In addition, the virtual viewpoint position may be changed based on manual virtual viewpoint position change input performed by a camera operator or the like.

The baseline-length control unit 705 controls the distance between the optical systems to actualize the baseline-length calculated by the virtual viewpoint position calculating unit 704. In addition, the baseline-length control unit 705 may control the above-described directing. In other word, the baseline-length control unit 705 may control the placement (distance) between at least two optical systems such as to make the virtual viewpoint follow the zoom operation with a delay in relation to the change in zooming of the image imaged by the imaging unit 701. As a result, the zoom operation can be given distinction.

A virtual viewpoint position outputting unit 706 acquires the calculated virtual viewpoint position and acquires the control values of the optical systems as required. In other words, the virtual viewpoint position outputting unit 706 acquires the information on the virtual viewpoint position of the observer based on information on the calculated immersion distance, and outputs the information outside. For example, the virtual viewpoint position outputting unit 706 generates and outputs notification information as information mapped to the virtual viewpoint position in relation to the focal position of the object to be imaged and the camera position. When only the output of the virtual viewpoint position is required, in other words, for example, when the immersion position information generation device, described hereafter, can perform sufficient mapping by including other information, the virtual viewpoint position outputting unit 706 just outputs the virtual viewpoint position.

In addition, the virtual viewpoint position is preferably outputted in real-time in synchronization with the image (imaging content) imaged by the imaging unit 701, or includes information that can be corresponded with a time stamp or the like that is synchronized with the taken image. In other words, when the information on the virtual viewpoint position is outputted, the information on the virtual viewpoint position is outputted in synchronization with the taken image or is outputted such as to include information that can be corresponded with a time stamp synchronized with the taken image. As a result, the scene in the image to which the virtual viewpoint position belongs can be understood in real-time, and synchronization of information during recording can be facilitated (where the virtual viewpoint is at which timing).

In addition, rather than the information on zoom and the virtual viewpoint position being outputted at all times, the information may be outputted as addition data elements only when the angle of view and composition change, such as in scene switching and zoom operation. In other words, the information on the virtual viewpoint position is outputted at a predetermined timing. As a result, traffic when images, audio, and other pieces of data are required to be transmitted can be reduced. In addition, information on camera position and focal position (focal distance from the camera position) being outputted as well is useful when grasping mapping with the overall position (the areas in the imaging location to which the positions are equivalent), particularly in instances in which these positions are not fixed.

Figure 8:
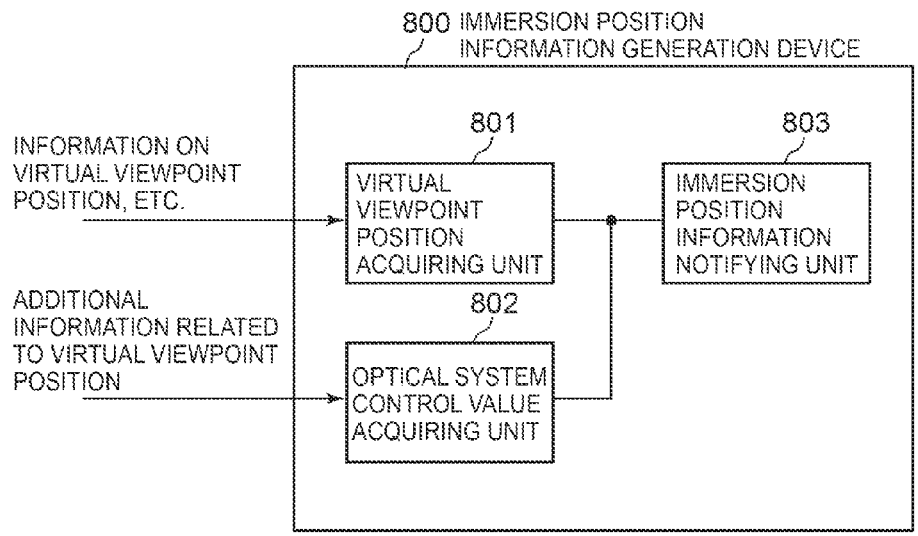
FIG. 8 is a block diagram of an example of the immersion position information generation device according to the embodiment of the present invention.

Next, an example of a configuration of the immersion position information generation device according to the embodiment of the present invention will be described with reference to FIG. 8. The configuration is not limited thereto, and other constituent elements may be included. An immersion position information generation device 800 receives the virtual viewpoint position outputted from the imaging control device 700 or from the imaging control device 700 via a communication interface of some kind. Here, an instance in which the virtual viewpoint position outputted from the imaging control device 700 includes other information and an instance in which the virtual viewpoint position includes information mapped in positional relationship with the object to be imaged are possible. As a positional relationship with the imaging control device 700, the immersion position information generation device 800 and the imaging control device 700 are connected within the same equipment (an instance in which both devices are mounted in a camera) may be considered. Alternatively, information being transmitted via an arbitrary transmission device or the like from equipment includes the imaging control device 700, and a virtual viewpoint position acquiring unit 801 included within equipment that receives the information (an instance in which the immersion position information generation device 800 is connected to editing equipment of a broadcast station that receives information from the camera via a device) may be considered.

In addition, the immersion position information generation device 800 changes, as required, the indicate method to that which facilitates understanding by the observer who is referencing a virtual viewpoint position display device that indicates the imaging content, the virtual viewpoint position, and the like. For example, when the camera operator is the observer, information on correlation with the zoom magnification is indicated. In addition, for example, when the director or stage director of the image is the observer, changes in the virtual viewpoint and information on change patterns for directing are indicated. In addition, for example, when the viewer is the observer, mapping information of the virtual viewpoint position in the overall position is indicated. Constituent elements of the immersion information generation device 800 will be described hereafter.

The virtual viewpoint position acquiring unit 801 receives the information related to the position of the virtual viewpoint from the imaging control device 700. Depending on the configuration of the information elements that are received, in many instances, the information is required to be converted to information intuitively understandable (easily understood) by the observer. Therefore, the received information is sent to an immersion position information notifying unit 803.

An optical system control value acquiring unit 802 receives additional information related to the position of the virtual viewpoint from the imaging control device 700. Depending on the configuration of the information elements that are received, in many instances, the information is required to be converted to information intuitively understandable (easily understood) by the observer. Therefore, the received information is sent to the immersion position information notifying unit 803. Here, as an example of the information that is additionally acquired, information that can be corresponded with the time stamp on the taken image and the like can be considered (such as the flow of a series of optical system control and time stamp corresponding thereto). In addition, information indicating changes in the angle of view and composition, such as scene switching and zoom operations, may be acquired. Furthermore, information on the position of the camera in an imaging area and the focal position (focal distance from the camera position) may be acquired as well.

As information related to the position of the virtual viewpoint, when the required information can be collectively collected by the virtual viewpoint position acquiring unit 801, the virtual viewpoint position acquiring unit 801 can also serve as the optical system control value acquiring unit 802.

The immersion position information notifying unit 803 receives information from the virtual viewpoint position acquiring unit 801 and the optical system control value acquiring unit 802, and notifies the observer of information related to the immersion position. At this time, for example, the immersion position information notifying unit 803 may be that which generates an image in which the information related to the immersion position is added to the taken image, as shown in FIG. 5. In other words, the immersion position information notifying unit 803 adds other information enabling the virtual viewpoint position to be recognized and generates image information. The image information preferably takes a form based on the circumstances, such as, in addition to positional information based on the position of the virtual viewpoint, information simply giving notification of the type of viewpoint (such as that noting "the viewpoint is currently . . . "), mapping information in which a symbol indicating the immersion position is placed on a map or a schematic diagram of the imaging area, alarm information by a symbol or sound simply indicating that the immersion position has changed from the current state, and notification information enabling an intermediary (such as the editor of the image or an announcer) to make a comment in a secondary manner.

The immersion position information notifying unit 803 can combine the information from the virtual viewpoint position acquiring unit 801 and the optical system control value acquiring unit 802, thereby changing the information to be more easily understandable by the observer. For example, as a result of the information that can be corresponded with the time stamp on the taken image or the like, the scene in the image to which the virtual viewpoint position belongs can be understood in real-time, and synchronization of information during recording can be facilitated (where the virtual viewpoint is at which timing). In other words, the immersion position information notifying unit 803 adds information on the virtual viewpoint position to the taken image based on the information that can be corresponded with the time stamp on the taken image.

In addition, for example, as a result of the information indicating that changes in the angle of view and composition, notification of the switching timing of the virtual viewpoint can be given while reducing the traffic when image, audio, and other data are required to be transmitted. Furthermore, for example, as a result of the information on the actual zoom magnification of the camera, the virtual viewpoint position can be indicated with the zoom magnification, thereby notifying the observer (in this instance, the camera operator, the director, and the like) of the state of imaging. This form of notification of information is particularly useful when different types of control are performed for the purpose of directing and the like, instead of the immersion zoom being made to follow the zoom magnification of the camera at all times.

In addition, as a result of information such as the camera position, the focal position, and the like in the imaging area, the mapping with the overall position (the areas in the imaging location to which the positions are equivalent) can be easily indicated, particularly when these positions are not fixed. For example, the virtual viewpoint position is set in a median position between the camera and the subject based on zoom of the camera (in other words, when the camera and the subject are assumed to be stationary, a state in which zoom is about 2 times). However, when the focal distance at this time is changed (various factors such as subject movement and camera movement can be considered), unless information on the position of the subject and the position of the camera are also considered, an accurate position within the imaging area cannot be identified. Therefore, in such instances, mapping of the virtual viewpoint position in the imaging area is performed by identifying the position of the median point from the camera position and the focal distance, and the like.

The control value information (including positional information) required for mapping varies depending on the imaging area. For example, when notification including spatial condition of the area is required to be given, the angle of elevation above and below of the camera may also become required information. When information that is easily understandable to the observer is configured, the information is outputted to the observer. The method of notification and the notification destination differ depending on the observer.

The immersion position notifying unit 803 gives notification via a television receiver or the like using broadcast waves when, for example, the observer is a viewer of a live broadcast. In addition, for example, when the observer is a viewer of a recorded material, the immersion position information notifying unit 803 gives notification during playback by recording the information as addition information on the recorded material (including the image itself) or a recording medium. In addition, for example, when the observer is a person editing or controlling the image content in a relay station or a broadcast station, such as an editor, a director, or a stage director, the immersion position information notifying unit 803 gives notification via a monitor of a device, such as a switcher or editing equipment. In addition, when the observer is a person directly operating the camera, such as a cameraman, the immersion position information notifying unit 803 gives notification via a viewfinder or an information indicator section of the camera.

Figure 9:
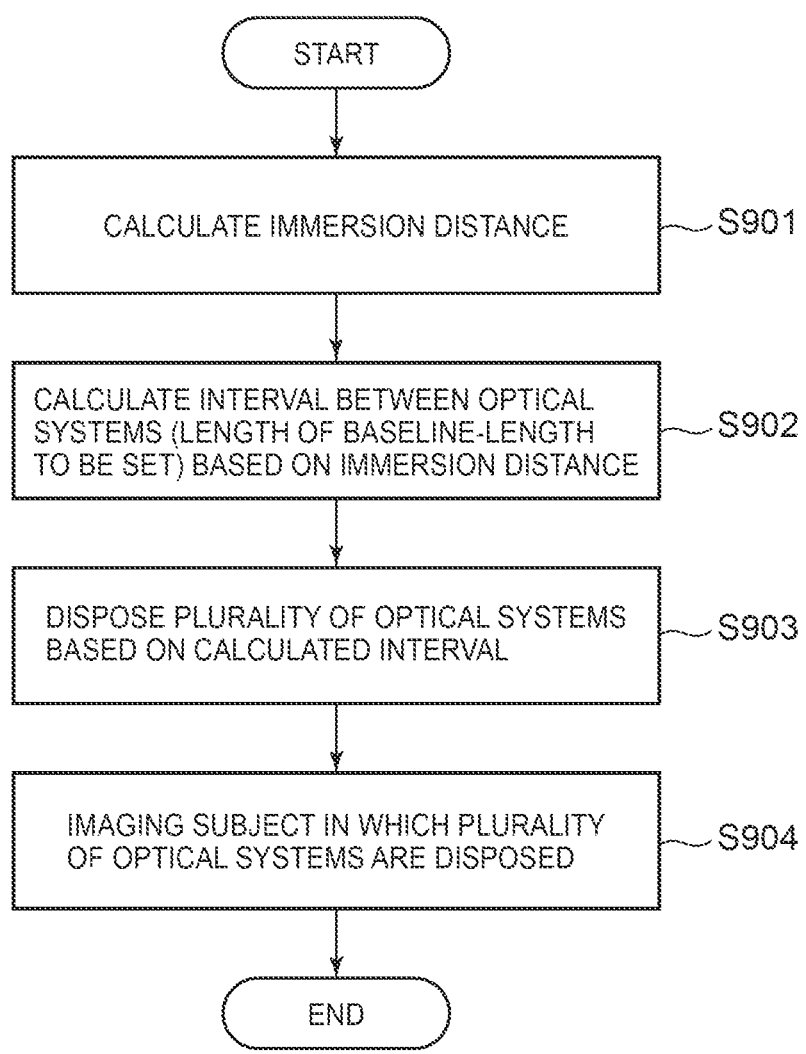
FIG. 9 is a flowchart showing an example of a processing flow of the imaging control device according to the embodiment of the present invention.

Next, an example of a processing flow of the imaging control device according to the embodiment of the present invention will be described with reference to FIG. 9. As shown in FIG. 9, the virtual viewpoint position calculating unit 704 calculates the immersion distance (such as 90 m) that is the distance from the virtual position at which the imaging control device should be disposed to actualize the desired zoom magnification to the actual position of the imaging control device based on a predetermined reference zoom magnification (such as 1 time), a desired zoom magnification in relation to the predetermined reference zoom magnification, and the distance from the imaging control device (may be the imaging unit 701) to the subject (Step S901). The virtual viewpoint position calculating unit 704 calculates, based on the calculated immersion distance, the interval between a plurality of optical systems (length of the baseline-length to be set) when the plurality of optical systems are disposed on an extension line connecting to the current position, to actualize the desired zoom magnification similar to when the desired zoom magnification is actualized by the imaging control device being disposed in a virtual position (Step S902). The baseline-length control unit 705 changes the predetermined baseline-length (such as a default value) to the calculated interval (length of the baseline-length to be set) and disposes the plurality of optical systems (Step S903). The imaging unit 701 images the subject in which the plurality of optical systems are disposed by the baseline-length control unit 705 (Step S904). As a part of directing, the baseline-length control unit 705 can control the disposal of at least two optical systems such that the virtual viewpoint is made to follow, with a delay, the change in zoom of images imaged by the imaging unit 701.

Figure 10:
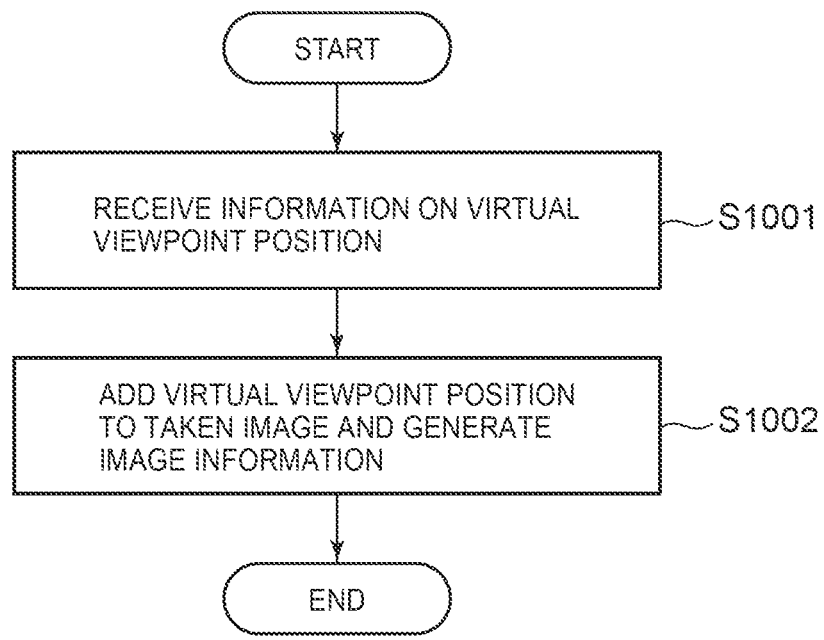
FIG. 10 is a flowchart showing an example of a processing flow of the immersion position information generation device according to the embodiment of the present invention.
Figure 11:
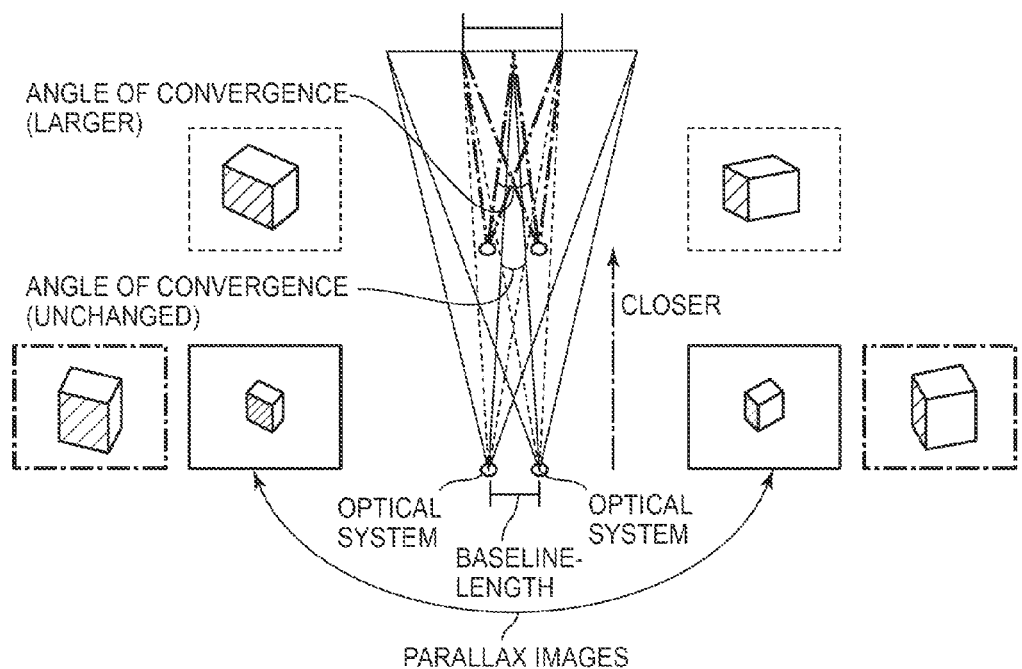
FIG. 11 is a diagram for explaining a conventional problem.

Next, an example of a processing flow of the immersion position information generation device according to the embodiment of the present invention will be described with reference to FIG. 10. As shown in FIG. 10, the virtual viewpoint position acquiring unit 801 receives the information on the virtual viewpoint position of the observer from the imaging control device (Step S1001). The immersion position information notifying unit 803 generates the image information in which the received information on the virtual viewpoint position is added to the taken image received from the imaging control device (Step S1002). At this time, the immersion position information notifying unit 803 may generate the image information with other information allowing the virtual viewpoint to be recognized (such as the above-described symbols or comments) added thereto, or may add the information on the virtual viewpoint position to the taken image based on the information that can be corresponded with the time stamp on the taken image.

As indicated above, in the present invention, immersive zoom can be performed in adherence to the zoom of the camera (or by adding an expressive intention of some kind), and the state can be communicated to the observer. This is mainly effective in instances in which images are imaged from medium and long distances (particularly sports and the like) and in instances in which obstructions and other subjects are not included in the near-field view in the composition. Instances in which obstructions and other subjects are not included in the near-field view in the composition refer to instances in which, even in close- and medium-range imaging, the composition can be set in advance to capture only the subject in the focal position and the like.

On the other hand, under differing conditions, particularly in close- and medium-range imaging, when obstructions and other subjects are included in the near-field view in the composition or the composition cannot be established in advance, this may result in fusion being inhibited for the observer, such as parallax of the subject (including unintended obstructions) in the foreground being excessively emphasized. In such instances, switching can preferably be performed from the immersive zoom state of the present invention to a state in which conventional (or other) zoom control is performed.

For example, a setting menu or a switch is preferably provided such as to enable imaging by switching between immersive zoom mode and other zoom modes by the operator of the camera. Alternatively, another optical system is used for the purpose of changing the baseline-length to enable ordinary imaging to be performed as well with the immersive zoom, and an image in which the baseline-length is not changed (or other control is performed) is also imaged simultaneously with imaging using immersive zoom. In other words, the baseline-length control unit 705, adjusts the baseline-length between optical systems other than the plurality of optical systems (at least two optical systems) based on the calculated baseline-length (interval) and makes an imaging mean including the other optical system image the subject. The imaging unit 701 images the subject in the state in which the plurality of optical systems are disposed at the predetermined baseline-length. Ultimately, the editor or the director preferably selects the image to be used (broadcast) based on the composition of the image and the like.

The invention described above is an example according to the embodiment of the present invention and is not limited thereto. For example, control may be performed that moves the virtual viewpoint by a method other than increasing the baseline-length. In addition, for example, a third viewpoint (a third optical system) may be comprised where the baseline-length is long. In other words, an optical system other than the two optical systems may be comprised. Specifically, when the calculated baseline-length (interval) cannot be secured by the plurality of optical systems (at least two optical systems), the imaging unit 701 images the subject in a state in which the baseline-length (interval) is secured using an optical system other than the plurality of optical systems. As a result, even when the baseline-length is long and cannot be handled by only two optical systems, the object of the present invention can be achieved by use of the third optical system (other optical system). In addition, for example, preset programs for directing operations, trigger commands, and buttons may be provided. As a result, various types of directing can be easily performed by anyone. In addition, for example, the provided image content may be a live broadcast or that which has been recorded in advance.

Each functional block used in the descriptions of the embodiments of the present invention, described above, can be actualized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed or a reconfigurable processor of which connections and settings of the circuit cells within the LSI can be reconfigured can be used after LSI manufacturing. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

In addition to what is claimed, the following is described:

An immersion position information generation method for generating, based on information from an imaging control device that images at least two images used to enable a user to perceive a subject positioned at a predetermined distance away or more from an imaging point as being three-dimensional, information enabling the subject to be perceived as being three-dimensional, the immersion position information generation method comprising:

a receiving step of receiving information on a virtual viewpoint position of the user from the imaging control device; and a generating step of generating image information in which the received information on the virtual viewpoint position is added to a taken image from the imaging control device.

When the image information is generated at the generating step, other information enabling the virtual viewpoint position to be recognized can be added to the image information.

At the generating step, the information on the virtual viewpoint position can be added to the taken image based on information that can be corresponded with a time stamp on the taken image.

INDUSTRIAL APPLICABILITY

The imaging control device, the immersion position information generation device, the imaging control method, and the immersion position information generation device of the present invention is capable of actualizing immersive zoom enlargement. Therefore, the imaging control device, the immersion position information generation device, the imaging control method, and the immersion position information generation device of the present invention are effective as an imaging control device, an immersion position information generation device, an imaging control method, and an immersion position information generation device by which images to be fused by a user are imaged, and the like.

The invention claimed is:

1. An imaging control device that images at least two images used to enable a user to perceive a subject positioned at a predetermined distance away or more from an imaging point as being three-dimensional, the imaging control device comprising:

an imaging unit for imaging the subject, the imaging unit including at least two optical systems disposed at an interval of a predetermined baseline-length;

a calculating unit for calculating, when a zoom magnification of the at least two optical systems disposed at the baseline-length interval serves as a reference zoom magnification, based on the reference zoom magnification, a desired zoom magnification in relation to the predetermined reference zoom magnification, and a distance from the imaging unit to the subject, an immersion distance that is a distance from a virtual position in which the imaging unit should be disposed to actualize the desired zoom magnification to an actual position of the imaging unit, and calculating an interval between the at least two optical systems when the at least two optical systems are disposed on an extension line of a line connecting actual positions of the at least two optical systems to actualize a desired zoom magnification similar to that when the imaging unit is disposed in the virtual position and the desired zoom magnification is actualized, based on the calculated immersion distance; and a control unit for changing the predetermined baseline-length to the calculated interval and disposing the at least two optical systems; and an outputting unit for acquiring information on a virtual viewpoint position of the user based on information on the calculated immersion distance and outputting the information on the virtual viewpoint position outside, wherein the imaging unit images the subject in a state in which the at least two optical systems are disposed by the control unit.

2. The imaging control device according to claim 1, wherein, when outputting the information on the virtual viewpoint position, the outputting unit outputs the information on the virtual viewpoint position in synchronization with a taken image or outputs the information on the virtual viewpoint position with information that can be corresponded with a time stamp synchronized with the taken image included therein.

3. The imaging control device according to claim 1, wherein the outputting unit outputs the information on the virtual viewpoint position at a predetermined timing.

4. The imaging control device according to claim 1, wherein, when the calculated interval cannot be secured by the at least two optical systems, the imaging unit images the subject in a state in which the interval is secured using an optical system other than the at least two optical systems.

5. The imaging control device according to claim 1, wherein, when the at least two optical systems themselves can be rotatably controlled, when an angle of convergence can be increased by the at least two optical systems being rotated, when calculating the interval, the calculating unit calculates the interval taking into consideration the angle of convergence formed by the rotation of the at least two optical systems.

6. The imaging control device according to claim 1, wherein:
the control unit adjusts a baseline-length between optical systems other than the at least two optical systems based on the calculated interval, and makes an imaging unit including the other optical systems image the subject; and
the imaging unit images the subject in a state in which the at least two optical systems are disposed at the interval of the predetermined baseline-length.

7. The imaging control device according to claim 1, wherein the control unit controls disposal of the at least two optical systems to make the virtual viewpoint follow, with a delay, a change in zoom of an image imaged by the imaging unit.

8. An imaging control method for imaging at least two images used to enable a user to perceive a subject positioned at a predetermined distance away or more from an imaging point as being three-dimensional, the imaging control method comprising:

a calculating step of calculating, when a zoom magnification of at least two optical systems disposed at an interval of a predetermined baseline-length serves as a reference zoom magnification, based on the reference zoom magnification, a desired zoom magnification in relation to the predetermined reference zoom magnification, and a distance from an imaging unit that includes the at least two optical systems and images a subject to the subject, an immersion distance that is a distance from a virtual position at which the imaging unit should be disposed to actualize the desired zoom magnification to an actual position of the imaging unit, and calculating an interval between the at least two optical systems when the at least two optical systems are disposed on an extension line of a line connecting actual positions of the at least two optical systems to actualize a desired zoom magnification similar to that when the imaging unit is disposed in the virtual position and the desired zoom magnification is actualized, based on the calculated immersion distance;

a control step of changing the predetermined baseline-length to the calculated interval and disposing the at least two optical systems;

an imaging step of imaging the subject in a state in which the at least two optical systems are disposed at the control step; and an outputting step of acquiring information on a virtual viewpoint position of the user based on information on the calculated immersion distance and outputting the information on the virtual viewpoint position outside.

9. The imaging control method according to claim 8, wherein, at the outputting step, when the information on the virtual viewpoint position outputted, the information on the virtual viewpoint position is outputted in synchronization with a taken image or outputted with information that can correspond with a time stamp synchronized with the taken image.

10. The imaging control method according to claim 8, wherein, at the outputting step, the information on the virtual viewpoint position is outputted at a predetermined timing.

11. The imaging control method according to claim 8, wherein, when the calculated interval cannot be secured by the at least two optical systems, at the imaging step, the subject is imaged in a state in which the interval is secured using an optical system other than the at least two optical systems.

12. The imaging control method according to claim 8, wherein, when the at least two optical systems themselves can be rotatably controlled, at the calculating step, when the interval is calculated, when an angle of convergence can be increased by the at least two optical systems being rotated, the interval is calculated taking into consideration the angle of convergence formed by the rotation of the at least two optical systems.

13. The imaging control method according to claim 8, wherein:
at the control step, a baseline-length between optical systems other than the at least two optical systems is adjusted based on the calculated interval, and an imaging unit including the other optical systems images the subject; and
at the imaging step, the subject is imaged in a state in which the at least two optical systems are disposed at the interval of the predetermined baseline-length.

14. The imaging control method according to claim 8, further comprising:
   a step of controlling disposal of the at least two optical systems to make the virtual viewpoint follow, with a delay, a change in zoom of an image imaged by the imaging unit.

\* \* \* \* \*